2,270,773

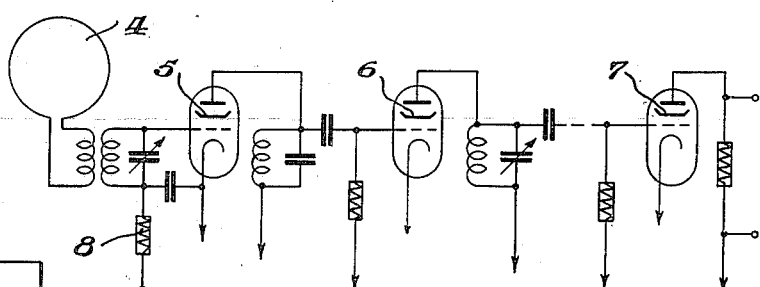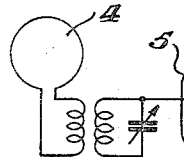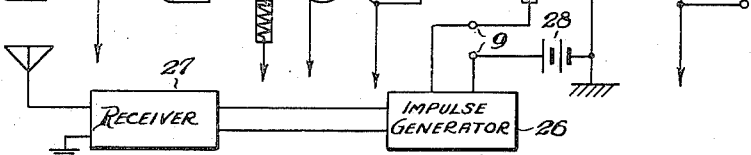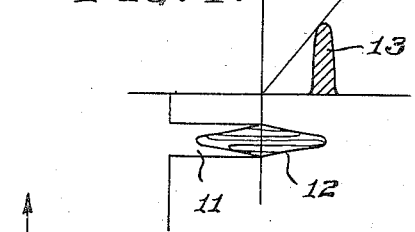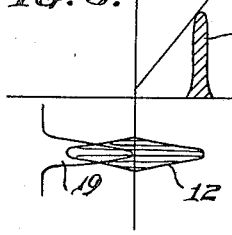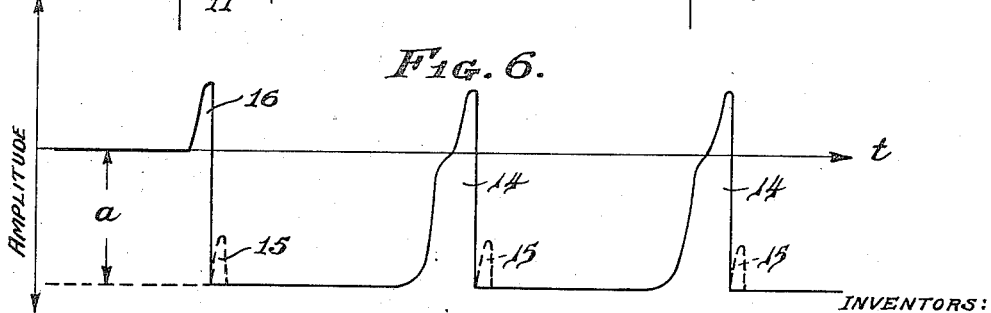

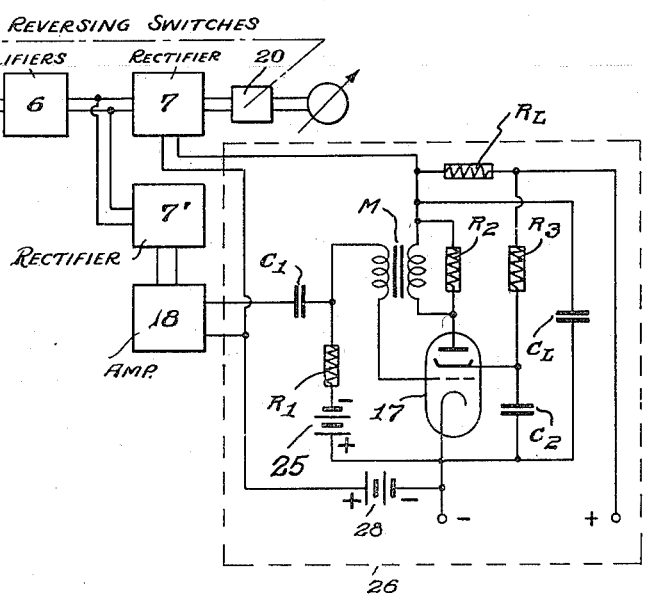
Fig. 7.
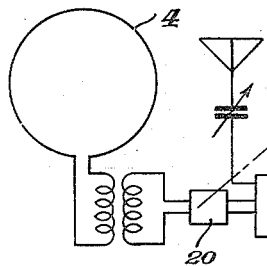
Fig. 9.
Fig. 10.
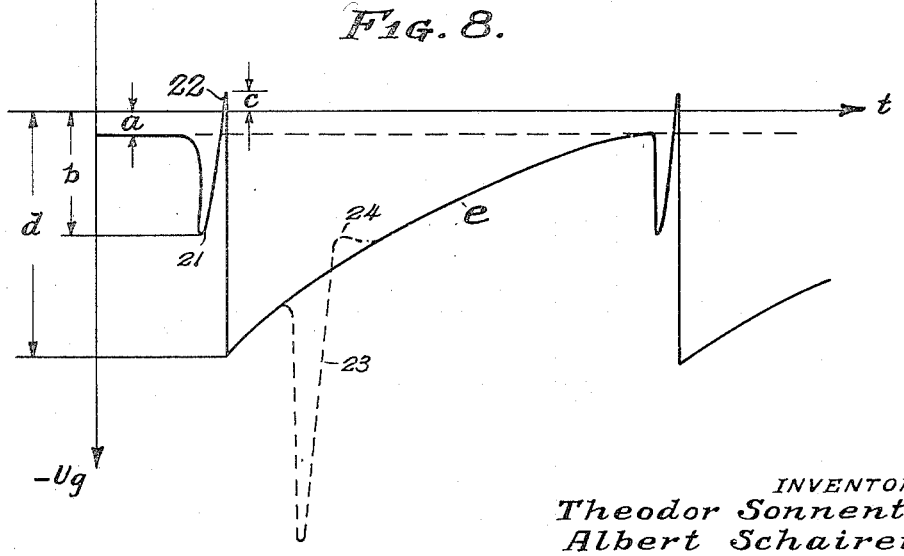
Fig. 8.
INVENTORS:
Theodor Sonnentag
Albert Schairer
& Günther Ulbricht
Attorney Patented Jan. 20, 1942

UNITED STATES PATENT OFFICE 2,270,773

IMPULSE DIRECTION FINDER

Theodor Sonnentag, Berlin, Albert Schairer, Berlin-Tempelhof, and Günther Ulbricht, Blankenfelde-Mahlow, Germany, assignors to Telefunken Gesellschaft für Drahtlose Telegraphie m. b. H., Berlin, Germany, a corporation of Germany Application March 8, 1938, Serial No. 194,554
In Germany March 25, 1937

8 Claims. (Cl. 250—11)

This invention relates to impulse direction finders and has for its objects the provision of a method of and means for making possible the audible indication of a course or bearing with an impulse type direction finder, and the automatic elimination of interference caused by the reception of reflected impulses.

This invention will be better understood from the following description when considered in connection with the accompanying drawings. Its scope is indicated by the appended claims.

Referring to the drawings, Fig. 1 is a representation of a cathode ray image of a ground wave and a sky wave impulse; Figure 2 is a schematic illustration of conventional means for applying biasing impulses to the grids of the radio frequency amplifiers of an impulse receiver; Figure 3 is a schematic illustration of a system in accordance with this invention; Figures 4 to 6, inclusive, and 8 to 10, inclusive, are operational curves to explain the operation of this invention; and Fig. 7 is a detailed schematic diagram of a preferred system for obtaining impulses.

It is a well known fact that electric direction finding methods which are predicated upon the use of a frame or loop aerial will result in faulty bearings whenever indirect radiation arises due to reflection, especially from the layers above the surface of the earth, in addition to the direct ground radiation or wave. Methods are also known in which these errors are avoided. One of these methods is known as the impulse direction finder method. This method is based upon the transmission from a sending or beacon station of impulses, which, after amplification in the direction finding receiver, are scanned with an oscillograph which is synchronized with the impulse frequency so that a stationary pattern is produced. When ground wave impulses and reflected or echo impulses are received, the ground wave impulses and the echo impulses are distinguishable from one another by virtue of the fact that, due to the difference in the length of the path traversed by the direct and reflected radiations, the main impulses and the echoes do not arrive at the same instant and are separately visible in the oscillograph. For example, if the oscillographic device consists of a Braun or cathode ray tube, then the pattern or image upon the screen thereof looks approximately as shown in Fig. 1, where 1 is the screen of the Braun tube, and where 2 and 3 are the main impulse and the echo impulse, respectively, which are visible separately on the screen. Now, according to the method known in the prior art, the direction finder loop is turned so that the pattern of the main impulse disappears or exhibits a minimum.

Suggestions have been disclosed in the prior art to substitute an auditory system for the visual system of direction finding described above, for the reason that, as is well known, the ear is far more able to distinguish a beacon signal from the general noise than is the eye. The ear, however, cannot distinguish the main impulse from the echo. For this purpose, automatic volume control has been suggested which, upon arrival of the main signal or impulse, blocks the direction finding receiver transiently so that the echo impulse is inoperative. In such a case the time constant of the automatic volume control must be so small that the blocking action is completed within the time elapsing between the reception of the main impulse and the reception of the echo. On the other hand, the time constant for the unblocking action must be so proportioned that the apparatus is restored to full sensitiveness before the arrival of the next main impulse.

However, this scheme is unworkable with a minimum signal strength direction finder because the main impulse, when taking bearings, is adjusted to a minimum or zero signal so that there is no chance for the automatic volume control action to be initiated.

Now, another suggestion that has been made is to utilize a second receiver apparatus for the purpose of actuating the automatic blocking of the direction finder, the accessory receiver having a non-directional aerial so that its output potential is independent of the setting of the directional loop and may be used to operate the automatic volume control of the direction finder. This has been effected by introducing a blocking impulse in the radio frequency portion or section of the directional receiver, similar to the procedure which is customary in fading compensation of conventional receivers. Fig. 2 shows an arrangement of this kind. The antenna circuit 4 is coupled to the radio frequency input circuit which includes tube 5. The receiver includes further radio frequency and intermediate frequency stages 6 followed finally by the rectifier 7. The audio frequency blocking impulses from an auxiliary receiver 27 are fed to the grid circuit of the radio frequency stage through a resistance 8. However, the blocking impulses themselves excite the oscillatory circuit in the receiver so that even when there is no signal from the direction finding loop a permanent note is audible in the receiver output which is indistinguishable from the note produced by the main impulse.

Now, according to the present invention, instead of blocking the amplifiers by an impulse, the rectifier 7 is controlled by a fixed bias and an audio frequency bias derived from a separate receiver, as illustrated in Fig. 3. This is accomplished by means of a biasing battery 28 and an impulse generator 26 which is controlled by the impulses from an auxiliary receiver 27. The control impulses themselves never exceed the horizontal portion of the rectifier characteristic. As a result, no change of current is produced in the plate circuit of the rectifier by the control impulses, and no note due to variations in the bias voltage is audible in the output of the receiver.

This will be better understood by referring to Fig. 4, in which 10 represents an ideal rectifier characteristic, while 11 is one of the periodically arriving substantially rectangular control impulses. The amplitude of such a control impulse is so chosen that it will extend just as far as the bend of the characteristic. If, then, the rectifier is fed with an additional radio frequency or intermediate frequency potential 12 (for instance, the main impulse) in synchronism with the arrival of the control impulse, the resultant voltage falls in the ascending portion (13) of the rectifier characteristic and the modulation becomes perceivable in the receiver output.

Now, when taking bearings from beacons located at a relatively great distance, the main impulse and the echo may fall very closely together, since the length of the path of propagation of the main impulse is but slightly different from that of the echo. It is therefore desirable to obtain very narrow control impulses at the receiving end. According to a further object of the invention, compression of the incoming impulse is obtained by imparting to the control impulse of the receiver a very definite form, say, a sinuous triangular, rectangular or similar form.

This idea is illustrated in Fig. 5, where the same reference numerals are used as in Fig. 4. By choosing a suitable shape for the control impulse 19, an appreciable constriction of the rectified ground wave impulse is secured. Alternatively, the difficulty caused by the closeness of the two impulses can be eliminated, according to the invention, by providing a bias or control voltage which has a shape similar to that represented in Fig. 6. The control impulses 14 exhibit a very sudden and steep decline so that the receiver is blocked for the echo 15.

In Fig. 6, the voltage amplitude at the grid of the rectifier is plotted against the time $t$. Above the $t$ axis the rectifier is opened, while below the same it is blocked. Initially, that is before the arrival of any signal, the rectifier is subject to the negative biasing voltage $a$ and the control impulse. The two voltages are so polarized that the bias voltage $a$ is just neutralized by the control impulse, so that the first incident ground wave impulses 16 renders the grid of the rectifier 7 positive (Fig. 3). Owing to the precipitous drop in the grid bias the next space-wave impulse or echo arrives an instant after the receiver has been shut.

As already pointed out above, the blocking of the rectifier 7 must be accomplished as rapidly as possible, in order that the echo following the main impulse may be suppressed as completely as possible. Moreover, the control impulses must be synchronized with the signal impulses and the two must be properly phased.

Synchronization is accomplished by means of a saw-tooth relaxation generator which is controlled by the signal impulses. The correct phase is obtained by triggering the saw-tooth relaxation generator at the instant the peak of the main impulse has passed. This is accomplished, according to the invention, by synchronizing the generator by a voltage which is derived from the collapse of the main impulse and which results when the main impulse is fed through a resistance and capacity network.

Fig. 7 shows an exemplified embodiment of this method of the invention as applied to an impulse direction finder of the left-right indicator type. The same reference numerals in Fig. 7 stand for similar parts in Figs. 2 and 3. The switch or reversing means 20, required in connection with the operation of left-right direction finding receivers with visual indication, are indicated as being included in the loop aerial circuit and in the receiver output circuit. In this embodiment of my invention a second rectifier 7' is utilized the output of which is here brought by way of example through an amplifier 18 to a capacity-resistance network $C_1$—$R_1$ which is included in the grid circuit of tube 17. The apparatus included in the box 26 shown by the dash lines represents the saw-tooth relaxation generator for producing the control impulses. The generator should not be capable of producing spontaneous relaxation waves. For this reason, the control grid of the tube is impressed with an optionally variable negative biasing potential. In addition to the charge condenser and the feedback coil, there should be no other energy storing means.

The operation of the arrangement is as follows:

Initially, that is, before a signal impulse has been received the tube 17 is completely blocked owing to the high negative biasing potential impressed on its grid by a battery 25, or the like. Hence, condenser $C_L$ becomes charged through resistance $R_L$ to the full anode battery potential and holds this potential. A positive unbiasing potential is thus applied to the receiver rectifier 7 which is able to neutralize the fixed negative bias potential supplied by a battery 28 so that the receiver is ready to receive a signal impulse. Now, as soon as a main impulse, which is negative due to the increased potential drop across the plate resistance of the rectifier 7' (Fig. 9), is fed to the network $C_1$ $R_1$, a derived voltage consisting of two crests of opposite polarity, as shown in Fig. 10, is impressed across the resistance $R_1$. The first impulse itself does not alter anything in the condition of blocking of the tube 17 inasmuch as it is negative. The positive voltage peak which is created by the collapse of the ground wave impulse, however, overcomes the fixed bias 25 and causes a small plate current to flow in tube 17. This plate current in turn results in a voltage across the feedback or tickler coil of transformer M; and this voltage acts upon the grid in such a way that it will grow still more positive.

This means that the plate current and the grid potential increase at an immense rate, and the consequence is that the condenser $C_L$ is discharged very rapidly through the tube and the potential which formerly opposed the negative blocking potential is rapidly reduced so that the detector tube is cut off. Such tremendous rate of increase of grid potential of tube 17 continues until there is incipient flow of grid current. At the instant plate current ceases to increase, a sudden potential pulse arises across the transformer M which causes the grid to become negative at just the same high speed that it became positive previously. Incidentally, also the condenser $C_1$ becomes negatively charged suddenly. Through the resistance $R_1$ and the plate resistance of the amplifier 18 it becomes discharged again at a slower rate. In other words, during the period of time when echoes are liable to come in, the grid of tube 17 preserves its high negative potential so that it is not triggered again by the sky wave. After discharge of the condenser $C_1$, the impulse generator is restored to the initial neutral or quiescent state, and is ready for the picking up of another main impulse. At the same time the condenser $C_L$ begins to charge, and the neutralizing potential slowly increases until the rectifier is again ready to receive the next ground wave impulse.

Fig. 8 shows the time-shape of the grid potential of tube 17 upon arrival of the derived impulses. Initially, the tube 17 is subject to a negative voltage $a$. But by the incoming negative ground wave impulse 21 the grid is impressed with a biasing voltage $b$; the following positive voltage peak 22 which is derived from the collapse of the main impulse, reaches the positive value $c$. The grid current whose flow is started as a result causes the tube at once to become negative again, that is, a biasing voltage $d$ is impressed thereon which charges the capacitor $C_1$. The discharge of the condenser $C_1$ will then occur roughly in accordance with curve $e$. A certain length of time after the arrival of the main impulse, there arrives also the sky-wave impulse. The derived voltage produced by this impulse is indicated by the dash line 23, 24. Since the condenser $C_1$ is still negatively charged, the positive potential peak 24 produced by the sky-wave impulse is incapable of unblocking the tube, so that the echo is unable to release the sawtooth action, even when the echo amplitude surpasses that of the main impulse. By the time the next main impulse arrives, the supplemental negative biasing potential stored in $C_1$ has disappeared so that the normal sensitivity or responsiveness has been restored.

By suitable choice of the time constant of network $C_1R_1$, the sensitiveness of the arrangement can be rendered very high. Moreover, it is feasible to impart to the time constant an optimum value with respect to the interval between the main impulses. It will be most expedient to make the time constant of the $R_1C_1$ network less than the time which elapses between two consecutive impulses, though greater than the period between a main impulse and the echo. For most purposes, a time constant which is about equal to one-half the main impulse sequence time is satisfactory.

The voltage across the charge condenser $C_L$ has roughly the form of a rectangular impulse as shown at 14 in Fig. 6. This voltage is impressed on the grid of rectifier 7 to overcome the negative bias of battery 28. The precipitous drop in the amplitude of the biasing voltage 14 is occasioned by the rapid discharge of condenser $C_L$ at the instant the derived positive peak 22 triggers the generator 26, that is, after the peak of the main impulse has passed. The more gradual rise in the amplitude of the voltage 14 corresponds to the finite time required for the voltage across condenser $C_L$ to be restored as the condenser is charged through resistor $R_L$.

The embodiment here disclosed has been described in connection with its application to a left-right indicator type impulse direction finder organization. However, it is possible to apply this arrangement also to other impulse direction finders, for instance, to schemes comprising a second or accessory receiver adapted to the creation of the opening impulses, as shown in Fig. 3.

We claim:

1. In an impulse direction finding receiver having a radio frequency rectifier, the method of reducing interference to the reception of ground wave impulses due to undesired sky wave impulses which includes the steps of biasing said rectifier so that it is initially receptive to ground wave impulses, generating biasing impulses which are initiated by voltages derived from the collapse of ground wave impulses, and applying said biasing impulses to said rectifier to make it nonreceptive to sky wave impulses, each biasing impulse being of such duration that said rectifier becomes receptive again before the arrival of a subsequent ground wave impulse.

2. In an impulse direction finding receiver having a radio frequency rectifier, the method of reducing interference to the reception of ground wave impulses due to undesired sky wave impulses which includes the steps of biasing said rectifier so that it is initially receptive, generating biasing impulses, initiating said impulses by a voltage derived from the collapse of received ground wave impulses, and applying said biasing impulses to said rectifier to make it nonreceptive to sky wave impulses, each biasing impulse being of such duration that said rectifier becomes substantially receptive before the arrival of a subsequent ground wave impulse.

3. In an impulse direction finding receiver having a radio frequency rectifier, the method of reducing interference to ground wave impulses due to the reception of sky wave impulses which includes the steps of biasing said rectifier so that it is initially receptive, separately rectifying ground wave impulses, differentiating said rectified impulse, utilizing said differentiated impulse to control a biasing impulse, and applying said biasing impulse to said rectifier to make said rectifier nonreceptive to the subsequent sky wave impulse, the duration of said biasing impulse being such that said rectifier is rendered receptive before the arrival of subsequent ground wave impulses.

4. In an impulse direction finding receiver having a radio frequency rectifier, the method of automatically eliminating sky wave impulses which occur after the reception of desired ground wave impulses which includes the steps of applying a fixed bias to said rectifier, superimposing on said fixed bias a variable bias of substantially equal amplitude and opposite polarity so that said rectifier is rendered initially operative, differentiating ground wave impulses to obtain a derived impulse coincident with the collapse of said ground wave impulse, and utilizing said derived impulse to change said variable bias so that said rectifier is made inoperative for an interval beginning at a time corresponding to the collapse of said main impulse.

5. In a direction finding system of the impulse type, a receiver having a radio frequency rectifier which is initially receptive to receive signal impulses, means responsive to a first received signal impulse for producing a control impulse, means for applying said control impulse to said rectifier to make said rectifier nonresponsive to a subsequent signal impulse arriving within a predetermined time after said first signal impulse, and means for removing said control impulse before the arrival of a third signal impulse after said predetermined time.

6. In a system of the character described, a receiver having a radio frequency rectifier which is initially receptive to received signal impulses, means initiated by the collapse of a first signal impulse for producing a control impulse of predetermined duration, and means for applying said control impulse to said rectifier, the amplitude of said control impulse being sufficient to prevent plate current from flowing in said rectifier so that rectification is not accomplished during the period said control impulse is applied to said rectifier whereby a second impulse which is subsequently impressed on said rectifier within said period is rejected.

7. In a system of the character described a receiver for the reception of ground and sky wave impulses, said receiver having a radio frequency rectifier, means for applying a fixed blocking potential to said rectifier, means for applying to said rectifier an unblocking potential which initially neutralizes said fixed blocking potential, means for reducing said unblocking potential at a period corresponding to the collapse of the ground wave impulse, said reducing means including an initially non-conductive thermionic tube, a condenser adapted to be charged by a source of direct current and discharged by said tube, and means for causing said tube to periodically become conductive and to discharge said condenser at a time controlled by the collapse of each ground wave impulse, said unblocking potential being derived from the potential across said condenser.

8. In an impulse direction finder system a receiver for receiving ground wave impulses and rejecting sky wave impulses, said receiver having a radio frequency rectifier, separate means for rectifying and differentiating received impulses, a capacitor, means for successively charging said capacitor, means coupled to said separate rectifying means for discharging said capacitor at a high rate in response to an impulse derived from the collapse of each received ground wave impulse, and means for utilizing the voltage across said condenser to control the bias applied to said radio frequency rectifier to make said radio frequency rectifier non-responsive for an interval following each of said ground wave impulses.

THEODOR SONNENTAG.
ALBERT SCHAIRER.
GÜNTHER ULBRICHT.